Jan. 5, 1960 G. F. W. POWELL 2,920,207
MEASURING DEVICES USED IN RADIO-ACTIVE MATERIALS
Filed Jan. 15, 1957 4 Sheets-Sheet 1

INVENTOR
GORDON F. W. POWELL
BY
Watson, Cole, Grindle & Watson
ATTORNEYS

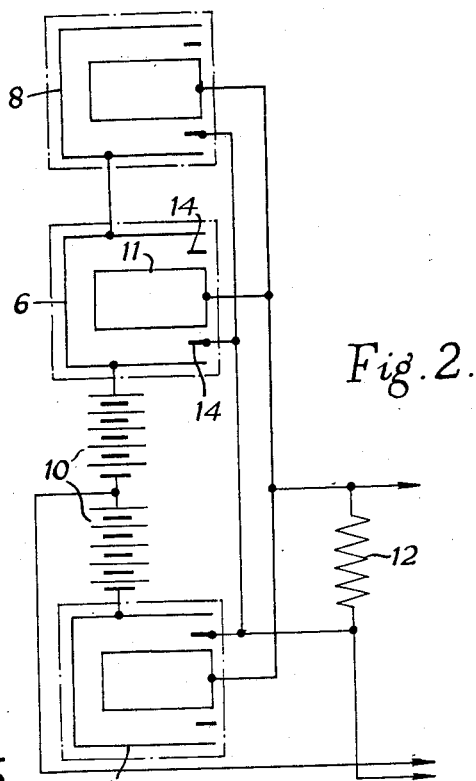
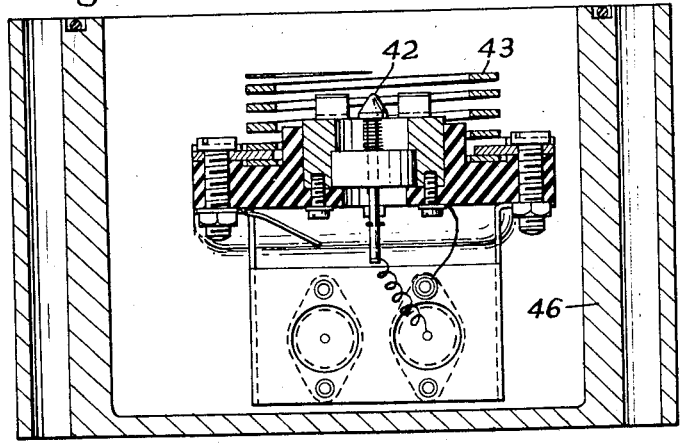

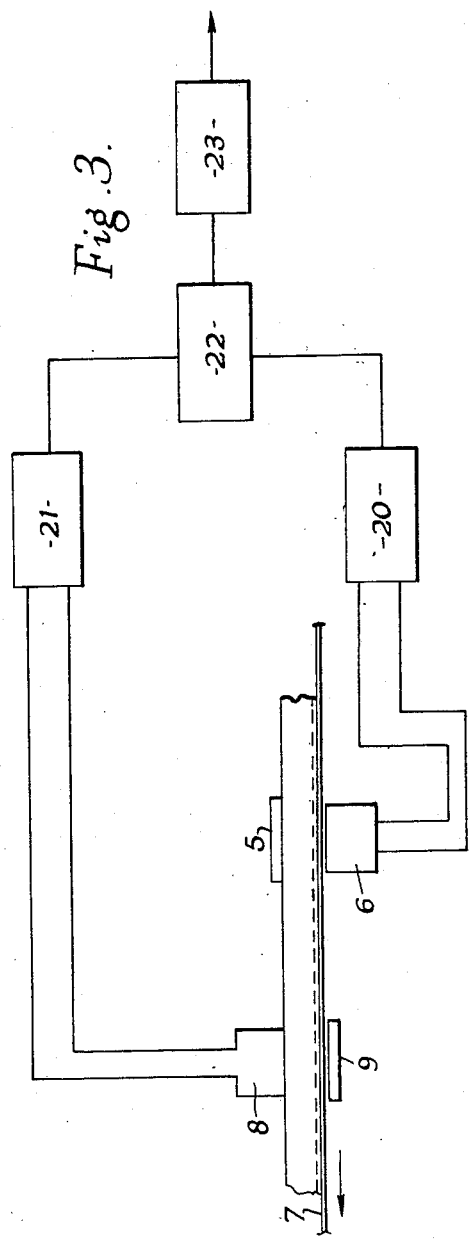

United States Patent Office 2,920,207
Patented Jan. 5, 1960

2,920,207
MEASURING DEVICES USED IN RADIO-ACTIVE MATERIALS

Gordon Francis Wellington Powell, Deptford, London, England, assignor to Molins Machine Company Limited, Deptford, London, England, a British company Application January 15, 1957, Serial No. 634,187

Claims priority, application Great Britain January 17, 1956

5 Claims. (Cl. 250—83.6)

This invention concerns improvements in measuring devices and more particularly radio-active scanning devices such as are used to measure the mass of a filler in a cigarette-making machine.

It has been proposed in United States patent application Serial No. 623,889, filed November 23, 1956, to measure the mass of an unwrapped or loose tobacco filler by passing it between a source of penetrative radiation such as a beta-ray emitter and ray-responsive device such as an ionization chamber which jointly constitute a measuring device referred to hereinafter as a scanning device.

The efficient use of radio-active scanning devices for such measurements depends very much on what is termed the "fixed geometry" of the arrangement, that is the preservation of the distances between a radio-active source and a ray-responsive device and the accurate disposition relatively thereto of the substance being measured, that is, a loose tobacco filler.

If the position of the filler varies with respect to the source, the proportion of rays emitted which pass through the filler alters, since the rays do not move in parallel lines but scatter considerably.

A loose filler is very liable to vary in its disposition with respect to the source because a filler of a given mass per unit length may be relatively deep with a correspondingly low density, or fairly shallow with a correspondingly high density. Further, the cross-section of the filler may be of irregular shape, one side, for example being higher than the other.

It will therefore be understood that a moving filler of uniform mass per unit length, will not necessarily cause a constant response in the ray-responsive device.

According to the invention there is provided a measuring device employing radio-active scanning devices for measuring the mass of a moving tobacco filler comprising a scanning device with a beta ray source at one side of said column and an ionization chamber at the other and a second scanning device with a beta ray source at the opposite side of said column to the first said source and its ionization chamber at the other, the chambers being connected electrically to combine the currents set up therein.

Preferably one scanning device is so arranged that the ray source and responsive means are respectively above and below the moving column, the other scanning device being reversed with respect to the first.

The ray-responsive device is an ionization chamber.

The radio-active material in a ray source may be so disposed that it lies obliquely across the travelling column of substance.

The ionization chambers may be connected in parallel to give a joint output, or the outputs from each chamber may be added and averaged. Means may be provided whereby the output of a chamber may be adjusted, that is, the chamber itself may be regulated so as to alter its output for a given passing mass.

The invention will be more fully described with reference to the accompanying drawings, in which:

Figure 2 shows a suitable circuit for coupling two ionization chambers.

Figure 3 shows diagrammatically another method of coupling the two chambers.

Figure 5 is a transverse section of the lower part of Figure 4.

Figure 1:
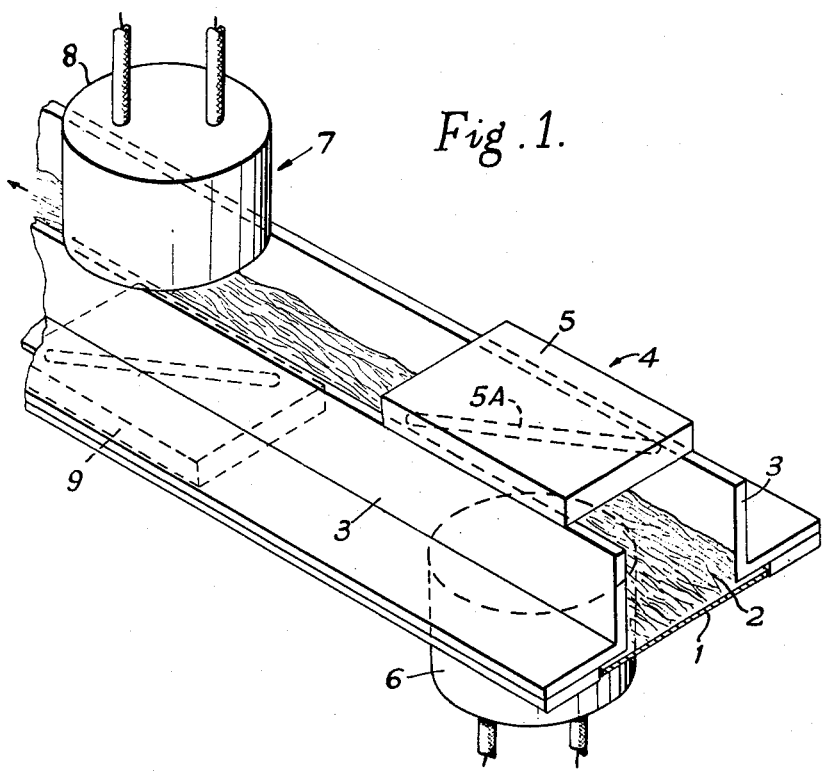
Figure 1 shows the application of the invention to the measurement of a moving stream of tobacco passing along a trough.

Referring first to Figure 1, a travelling tape 1, shown in section carries a moving stream of tobacco, that is, a loose filler 2, between guides 3 in order to convey it to other devices where it is, for example, shaped to form a cigarette rod and enclosed in a paper wrapper. A scanning device at 4 has its ray source 5 above the guides and an ionization chamber 6 beneath the tape. The radio-active material of the source is disposed obliquely across the guides as shown at 5A. The chamber is cylindrical and the source is made rather short. At a position a little farther along the guides is a second scanning device at 7. In this case the ionization chamber 8 is above the guides while the ray source 9 is beneath the tape. If it is assumed that there is no change in the disposition of the tobacco in the trough at positions 4 and 7 and given that the scanners are identical, as near as may be, and disposed relatively to the base of the trough at accurate and equal positions it will be seen that however the stream cross-section may be disposed with respect to the source of the first scanner, its disposition with respect to the source of the second scanner will be, so to speak, reversed, and the total current set up in the two chambers should be equivalent to that due to measurements made by two such scanners with the stream disposed at exactly equal distances from the ray source of each scanner. That is if it is imagined that a precisely equal set-up of two reversed scanners and a stream whose disposition is rigidly and equally fixed with respect to the scanners is provided, the result should be the same as the reversed scanner arrangement with a random but unchanging disposition of the stream with respect to the scanners.

Other factors however enter into the matter, for example, as the top face of the stream changes its distance from the upper source according to the density of a given mass (i.e. how it is packed) there is a change in scattering. On test, if said face is lower, that is farther from the source the ionization current increases; probably because of later scattering of the particles so that more are able to enter the chamber. Conditions at the other scanner are different because the lower face of the stream is at a fixed distance from the source while the remote face of the stream with a lowering in stream height will approach nearer to the source, giving a decrease in ionization current. Thus the two scanners are unlikely to balance one another but the result from the whole arrangement is nevertheless beneficial since the disposition of the two scanners does tend to compensate for variations in stream height, that is, variations due to disposition of the tobacco shreds, rather than to changes in absolute mass of the passing filler.

Referring now to Figure 2, a circuit is shown for coupling the ionization chambers of Figure 1 in parallel.

A source of D.C. voltage, shown as a battery 10, applies a voltage between the ionization chamber 6 and an interior part 11 which constitutes an electrode, the chamber 6 itself also constituting an electrode. The beta particles that enter the chamber 6 cause ionization of the gas in the chamber in the presence of the applied potential and the resultant current, which is a measure of the energy of the rays penetrating the tobacco, develops a voltage across a high value resistance 12.

For well known reasons it is desirable to use another scanning unit to form a balancing device, the radiation from the source of this unit passing through a standard absorber before reaching the chamber of the unit. The chamber 13 of this device is similarly subjected to a voltage from the battery 10, the applied potential being the same as that applied to the chamber 6.

The chamber 8 is shown in parallel with the chamber 6 and thus the currents in the chambers 6 and 8 are added and pass through the resistance 12. It will be understood that the absorber of the balncing device is arranged to give a balancing current equal to the joint current from chambers 6 and 8 when the filler 2 is of correct mass. The net output, that is, the voltage due to the difference between the currents from the chambers 6 and 8, and the chamber 13, is applied as indicated by the arrowheads to any suitable amplifying apparatus whereby useful power may be obtained for indicating the results of the measurement or, more usually, for controlling the feeding devices which supply tobacco to form the filler.

Each chamber is provided with a guard ring in the usual manner, the ring of chamber 6 being indicated by the reference 14 and the three rings are connected as shown.

Figure 3 shows a different arrangement for connecting the two chambers. The chambers and sources of Figure 1 are shown in the view but the front guide 3 and the tobacco shown in Figure 1 have been omitted. In this case the chamber 6 has its output leads connected to an amplifier 20, while the chamber 8 has its leads connected to an amplifier 21. The amplifiers 20 and 21 feed an apparatus 22 where the amplifier outputs are added and averaged and from this apparatus an output is taken to an amplifier 23 whose output may be used as described with reference to Figure 2. In this example, if a balancing unit is used its absorber will be suitably adjusted to equal the net output from the chambers 6 and 8 as averaged, when the tobacco mass is correct.

Instead of averaging the output of the two chambers as above described it is considered preferable to arrange matters so that if it is found that one chamber persistently gives a larger output than the other, a chamber can be adjusted to correct this. For example, where the tobacco filler is being measured, as in Figure 3, the source 5 must necessarily be far enough away from the filler to ensure that it cannot obstruct the movement of the filler under any circumstances since this would destroy the whole purpose of the invention. Nevertheless it is essential to keep the distance between source and emitter to the minimum and therefore the source 9 is nearer to the tobacco than the source 5 can be and although said distance is the same for both units, scattering and other factors may well differ as between the units. Means are therefore provided whereby the output of a chamber can be adjusted during setting up and testing to compensate for any such difference in output and a suitable chamber for this purpose will now be described.

Figure 4:
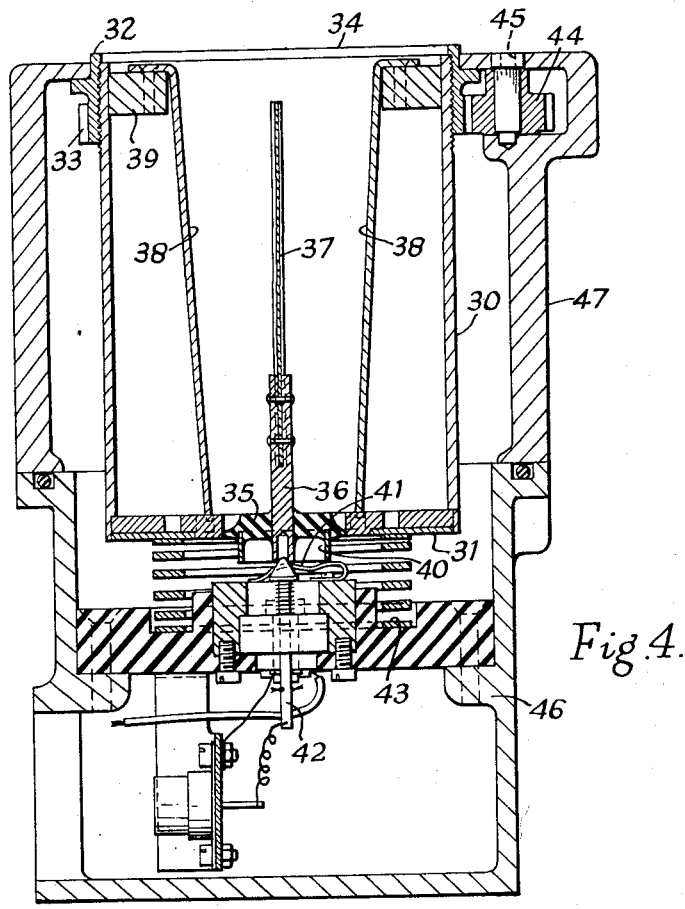
Figure 4 is a section of an ionization chamber and its mounting, the device being suitable for use with the present invention.

Referring to Figure 4, the chamber consists of a cylindrical metal casing 30, the bottom of which is enclosed by a disc 31 which is connected to the casing wall by soldering or welding so as to make a gas-tight seal. The upper end of the casing is closed by a threaded ring 32 having gear teeth 33 on its exterior and the top of the ring has a metal diaphragm or window 34. The lower part of the ring 32 and the casing 30 are joined so that the chamber is completely sealed and the middle of the disc 31 comprises a glass-to-metal seal at 35. At the middle of the glass portion 35 is a rod-shaped electrode 36 to which is attached a plate 37, the plate being formed of thin sheet metal corrugated lengthwise to increase its stiffness. At each side of the plate 37 are further plates 38 which are joined to a flange 39 on the interior of the casing 30 and are thus in metallic connection therewith. The plates 38 may converge towards one another, as shown in Figure 4, as the field strength declines at places more remote from the radio-active source. Beneath the glass 35 and surrounding the central electrode 36 is a metal ring 40 which constitutes the guard ring of the chamber and to which contact is made by a bifurcated spring contact 41. Between the arms of this contact there is arranged a spring pressed stud 42 which forms the connection to the central electrode 36. The chamber is supported on a large helical spring 43 which contacts with the base of the chamber and forms a connection thereto. The chamber may be rotated about its longitudinal axis by means of the gear 33 which is engaged by a pinion 44 which can be rotated by a key inserted in a polygonal hole 45. The chamber is filled with a suitable gas, say, a mixture of argon and carbon dioxide, and when the chamber has been properly filled with the gas it is sealed. The pressure in the chamber is slightly above atmospheric pressure, just enough to cause a slight bulge on the window or diaphragm 34. It will be seen from Figure 4 that the parts described are supported in a casing 46 and a cover 47 is provided which is clamped to this casing by bolts (not shown) and presses on the top of the chamber to hold it firmly in position and in close electrical contact with the spring 43.

Figure 6:
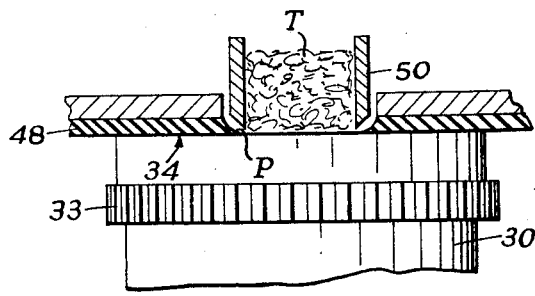
Figure 6 shows the exterior of the top of the chamber shown in Figure 4, as used in the present invention.

To avoid inaccuracies due to the accumulation of dust on the ionization chamber the trough along which the lose filler passes is arranged to lie across the circular top of the chamber, that is, the metal window 34 as shown in Figure 6, and the paper runs across the window in contact therewith and sweeps away any dust by its movement. In order to do this, the chamber diaphragm is arranged slightly above the normal level of the bottom of the trough, but insulated from any metallic parts thereof by plates 48. As shown in Figure 6, the paper web P lies on top of the chamber 30 with the tobacco T on the paper and confined laterally by guides 50.

The edges of the paper web P are turned up as shown to hinder the escape of filler or dust. The second chamber will of course be upside down and no considerable dust problem will arise but the usual blowing or suction devices may be employed to remove any dust which does accumulate for example on the source of the second unit.

Rotation of a chamber alters its sensitivity since when the plates 37 and 38 lie parallel to the path of the filler the effective aperture of the chamber is at a maximum and when they are at right angles thereto the aperture is at a minimum. This rotation affords a very delicate means of adjusting the sensitivity of a chamber.

In measuring a tobacco filler, this varies in height from a constant datum, that is, the web or paper carrying the filler. But changes in height usually mean there is more tobacco present if the filler rises and so the output from the chambers can be usefully employed to control the feeding devices which supply tobacco to form the filler.

What I claim as my invention and desire to secure by Letters Patent is:

1. A measuring device employing radio-active scanning devices for measuring the mass of a moving tobacco filler comprising a scanning device with a beta ray source at one side of said column and an ionization chamber at the other and a second scanning device with a beta ray source at the opposite side of said column to the first said source and its ionization chamber at the other, the chambers being connected electrically to combine the currents set up therein.

2. A measuring device as claimed in claim 1 wherein one scanning device is so arranged that the ray source and chamber are respectively above and below the moving column, the second scanning device being reversed with respect to the first.

3. A measuring device as claimed in claim 1 wherein the output leads of the chambers are joined in parallel.

4. A measuring device as claimed in claim 1 and comprising two amplifiers, each chamber having its output leads connected to a different one of said two amplifiers the output leads of said amplifiers being connected to apparatus wherein the respective outputs are added and averaged and said apparatus being connected to a further amplifier.

5. A measuring device as claimed in claim 1 wherein at least one chamber has flat plate electrodes and a window substantially normal to said electrodes, and means for moving the chamber to alter the orientation of the electrodes with respect to the moving filler, thereby altering the effective aperture of the chamber and thus its sensitivity.

References Cited in the file of this patent

UNITED STATES PATENTS

| | | |
|---|---|---|
| 2,525,292 | Fua et al. | Oct. 10, 1950 |
| 2,602,904 | Simpson | July 8, 1952 |
| 2,617,955 | Mandeville | Nov. 11, 1952 |

FOREIGN PATENTS

| | | |
|---|---|---|
| 684,503 | Great Britain | Dec. 17, 1952 |

OTHER REFERENCES

An X-Ray Method for Determining Tin Coating Thickness on Steel, by Beeghly, Journal of Electrochemical Society, April 1950, pages 152 to 157.

Continuous Measurement of Zinc Coatings Applied in a Continuous Coating Process, by Hayes, presented at the 31st meeting of the Galvanizers Committee sponsored by American Zinc Institute, Inc., St. Louis, Mo., April 21, 1954.